Feb. 2, 1965   J. G. WISTREICH ETAL   3,167,978
CONTROL SYSTEM FOR FORGING PRESS
Filed May 8, 1961   12 Sheets-Sheet 1
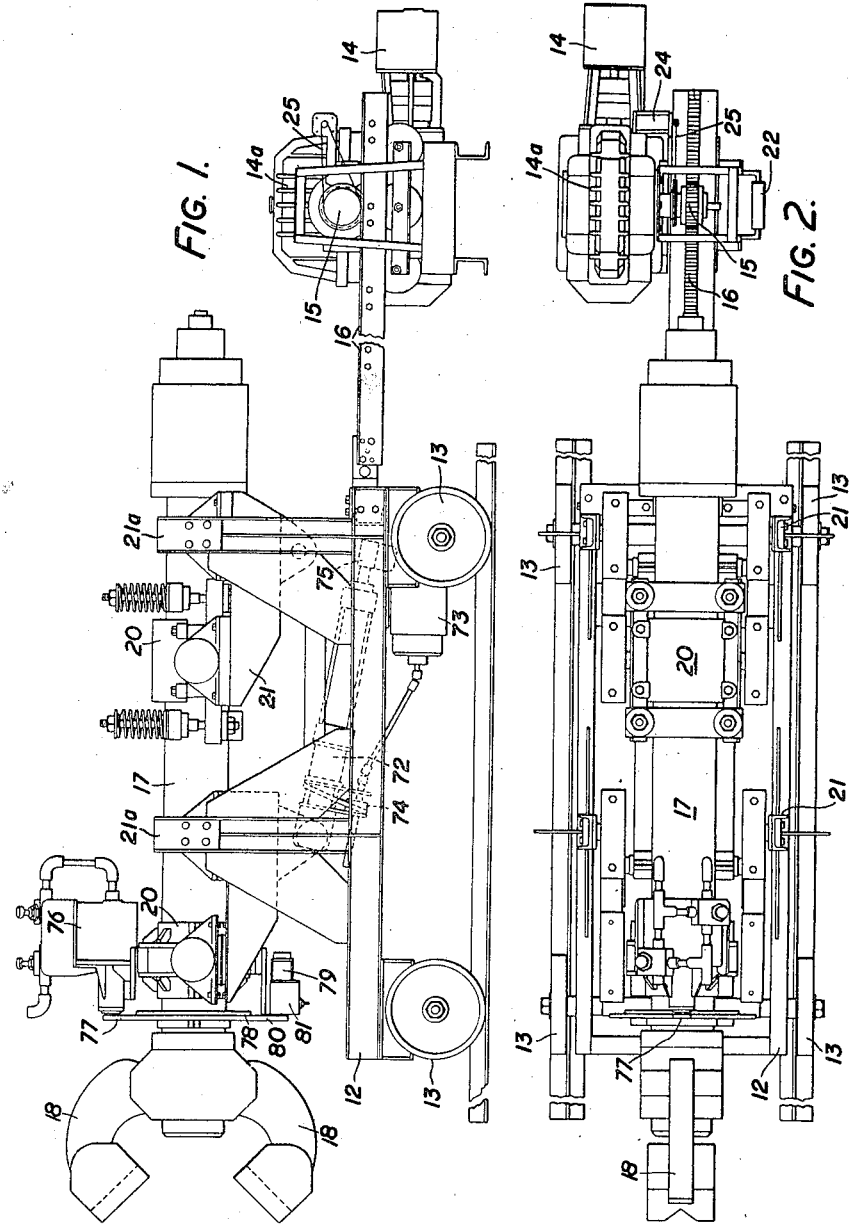
INVENTORS
JOHN GEORGE WISTREICH
PETER NORRIS BAKER, DECEASED
BY RAYMOND BAKER, ADMINISTRATOR
BY Hane and Nyrich
ATTORNEY

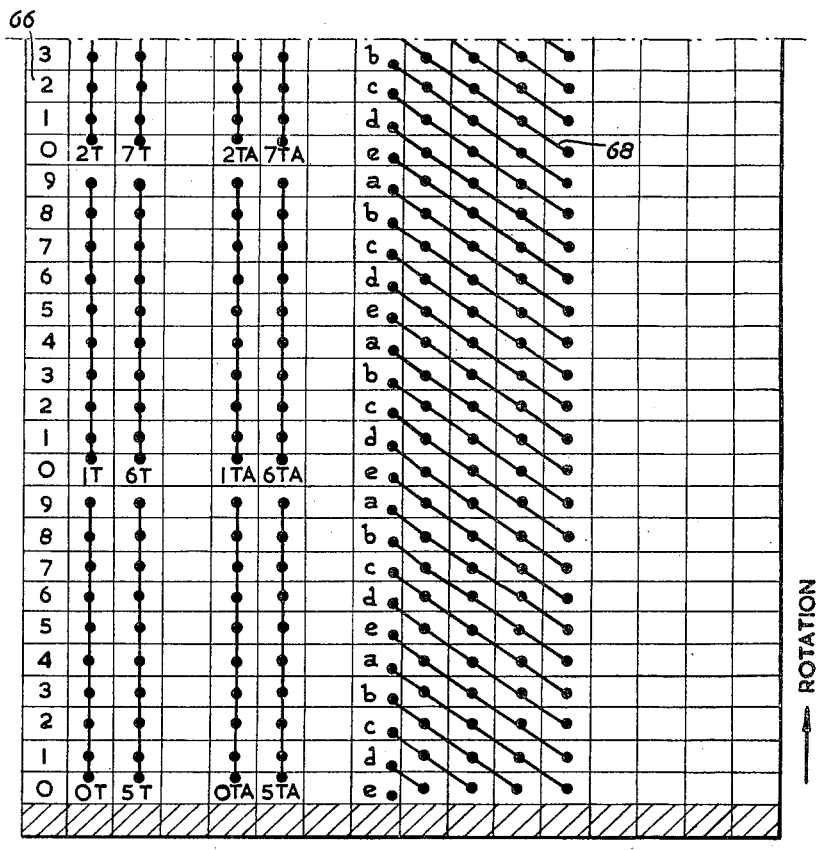
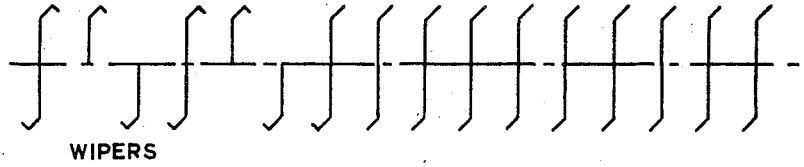
WIPERS
FIG. 3C.

Feb. 2, 1965  J. G. WISTREICH ETAL  3,167,978
CONTROL SYSTEM FOR FORGING PRESS
Filed May 8, 1961  12 Sheets-Sheet 7

INVENTORS
JOHN GEORGE WISTREICH
PETER NORRIS BAKER, DECEASED
BY RAYMOND BAKER, ADMINISTRATOR

BY Hane and Nydick
ATTORNEYS

Feb. 2, 1965   J. G. WISTREICH ETAL   3,167,978
CONTROL SYSTEM FOR FORGING PRESS
Filed May 8, 1961   12 Sheets-Sheet 11

INVENTORS
JOHN GEORGE WISTREICH
PETER NORRIS BAKER, DECEASED
BY RAYMOND BAKER, ADMINISTRATOR

BY Hane and Njdick

ATTORNEYS

United States Patent Office 3,167,978
Patented Feb. 2, 1965

3,167,978
CONTROL SYSTEM FOR FORGING PRESS
John George Wistreich, London, England, and Peter Norris Baker, deceased, late of Sheffield, England, by Raymond Baker, administrator, Sheffield, England, assignors to The British Iron and Steel Research Association, London, England, a British association
Filed May 8, 1961, Ser. No. 109,478
10 Claims. (Cl. 78—96)

This invention relates to electrical control systems for forging presses and particularly concerns a system for the co-ordinated control of the operation of a forging press and of the operation of a forging manipulator to position a work piece being forged by such press.

In co-pending applications Serial Nos. 694,050 and 749,940, filed November 1, 1957, and July 21, 1958, and now issued as U.S. Patents Nos. 3,036,253 and 2,922,053, respectively, there are described and claimed control systems for controlling the operation of a forging press in which the movable member of the press is controlled in reciprocation between an accurately defined lower position which determines the thickness of the forging and an upper position sufficiently spaced from such lower position to permit manipulation of the work piece between successive strokes of the press.

In co-pending application Serial No. 852,272 filed November 12, 1959, now Patent No. 3,139,569 there is described and claimed a control system for controlling the operation of a forging manipulator to effect any desired longitudinal, vertical and rotational positioning of a work piece between the members of a forging press.

The present invention is concerned with an overall control system for co-ordinating the operation of press and manipulator and will be described hereinafter as applied to the press and manipulator control systems of the co-pending applications referred to above.

In the following description reference will be made to the accompanying drawings of which FIGURES 1–6 correspond to FIGURES 1–6 of co-pending application Serial No. 852,272 referred to above, FIGURES 7–14 correspond to the drawings of the first two co-pending applications referred to above.

Figure 5:
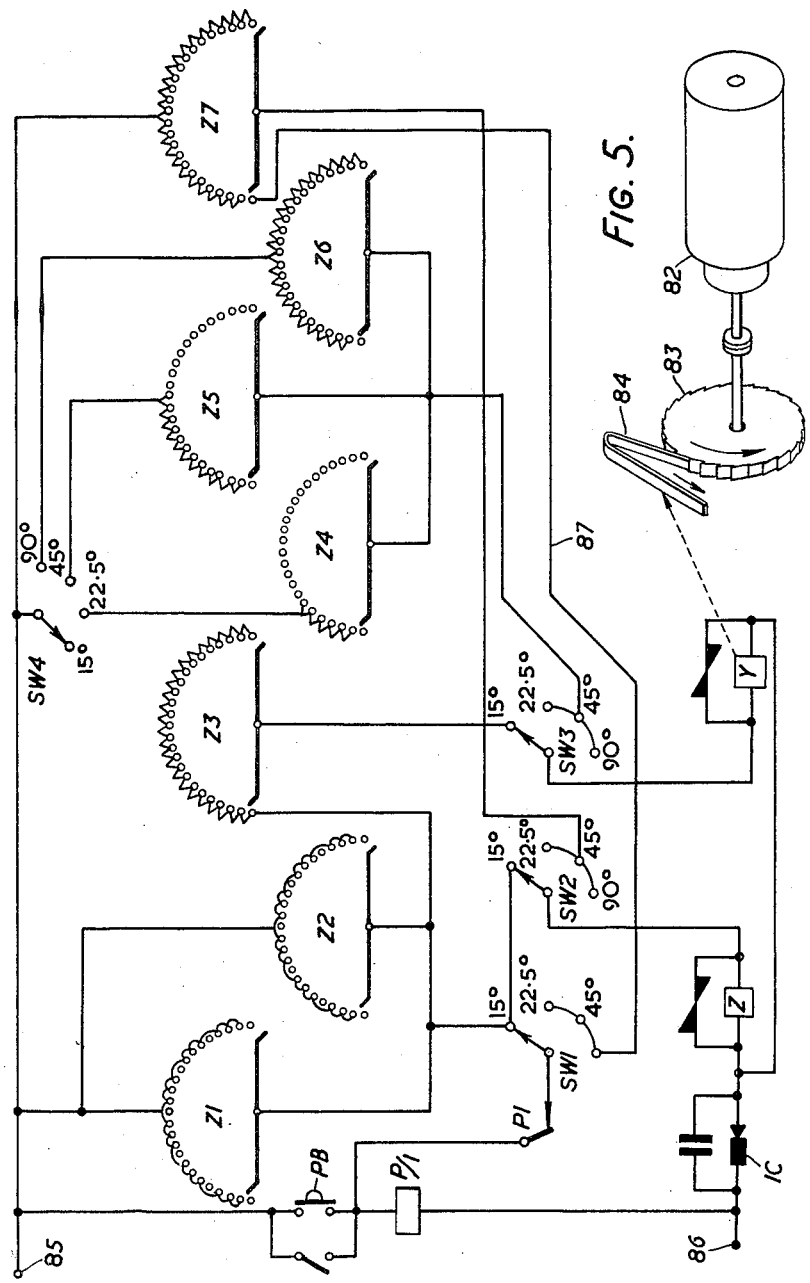
Figure 6:
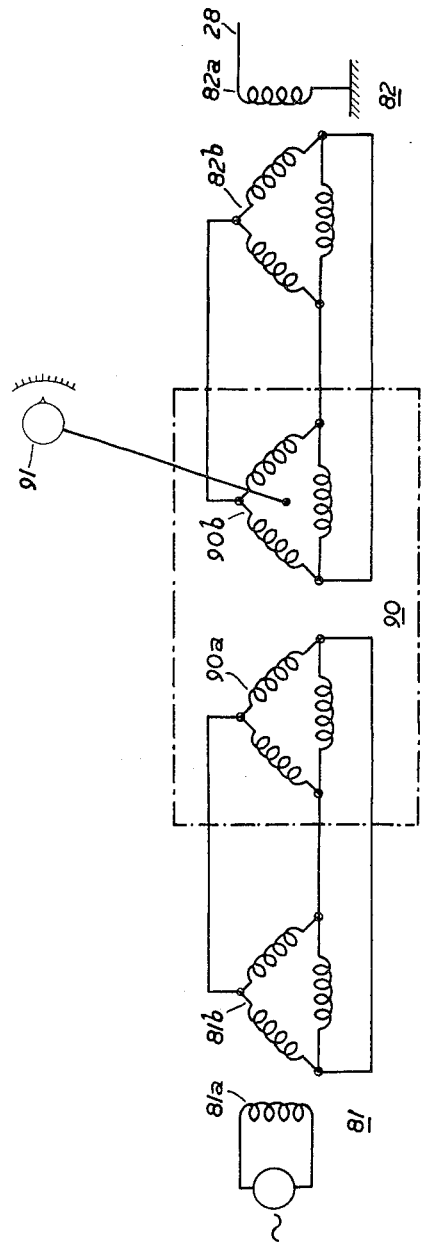
Figure 7:
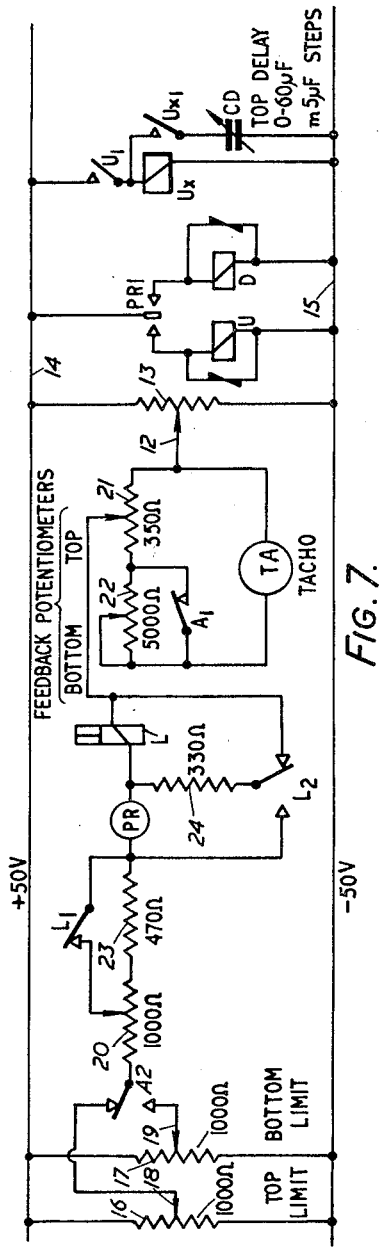
Figure 8:
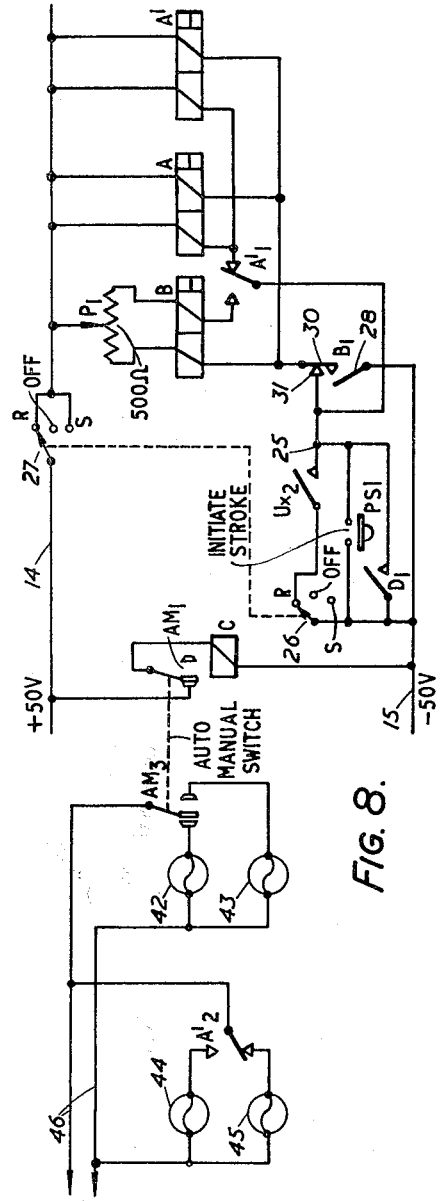
Figure 9:
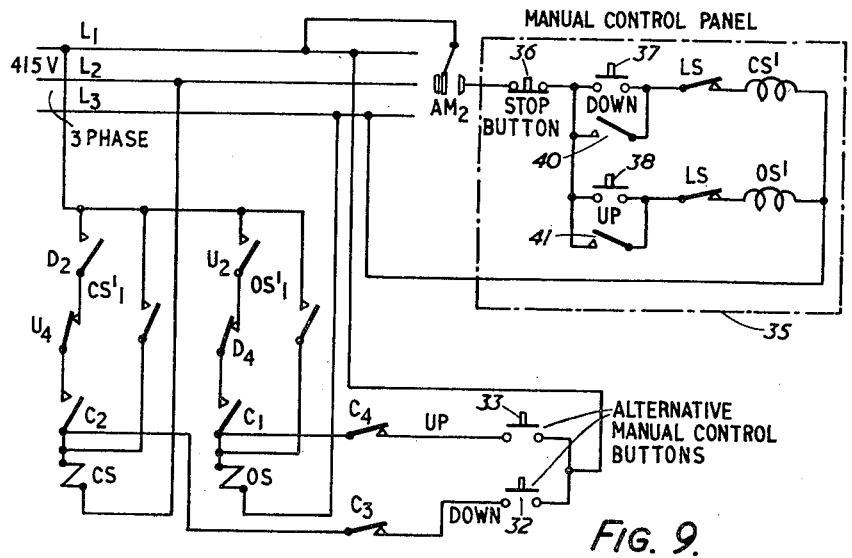
Figure 10:
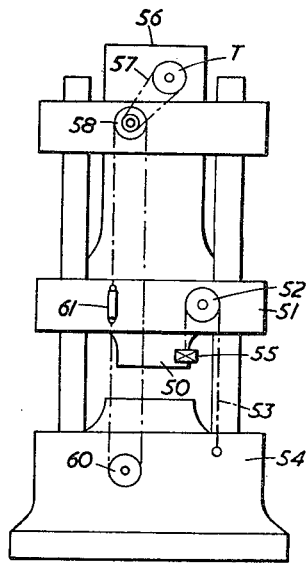
Figure 11:
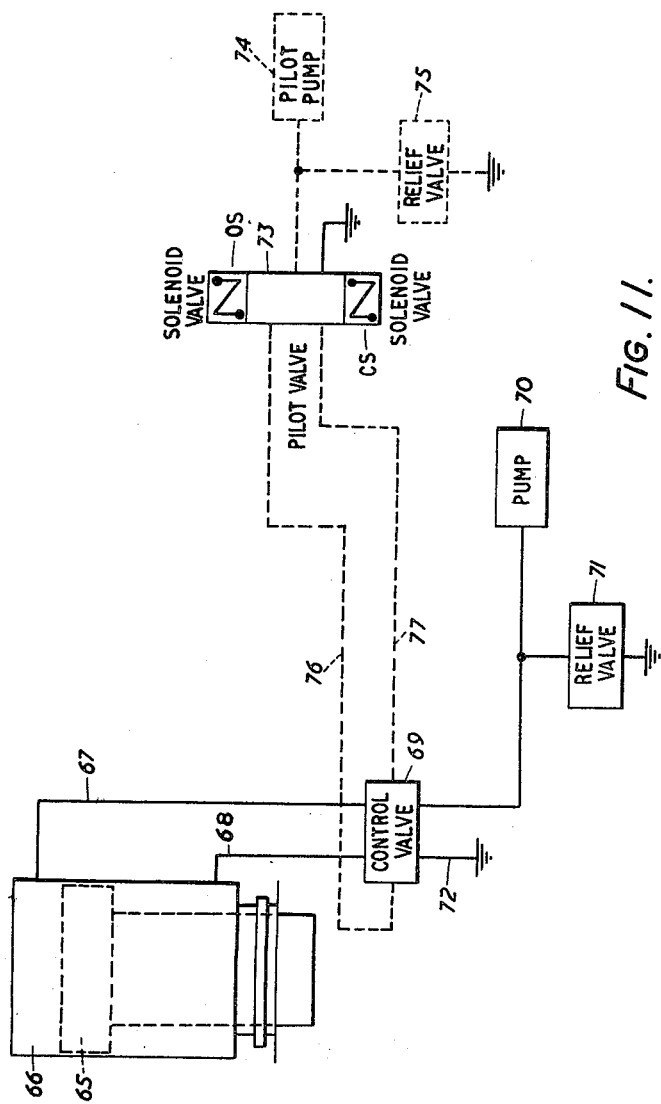
Figure 12:
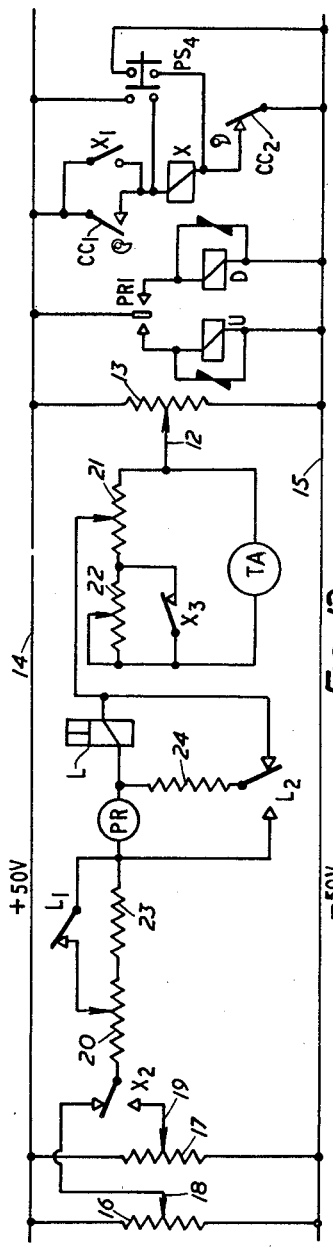
Figure 13:
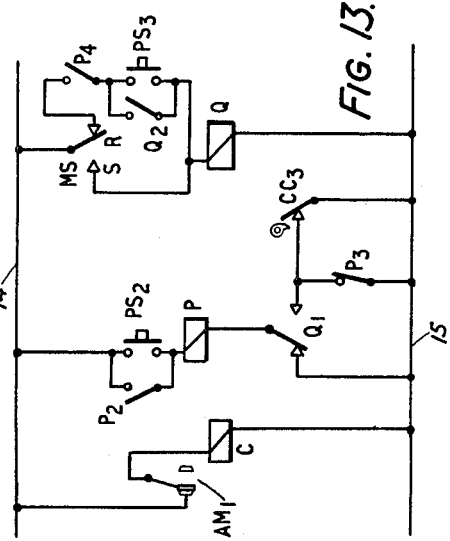

In the drawings:
FIGURES 1 and 2 are a side view and an end view respectively of a manipulator,
FIGURES 3A, 3B and 3C together form a circuit diagram of the error detection circuit for longitudinal position control of the manipulator, and are sometimes referred to collectively as FIGURE 3 for convenience,
FIGURE 4 is a circuit diagram of the setting circuit for longitudinal position control of the manipulator,
FIGURE 5 is a circuit diagram of the setting control circuit for rotational position control of the manipulator peel,
FIGURE 6 illustrates the circuit of the synchros used in setting of the peel.
FIGURES 7, 8 and 9 are circuit diagrams of a position control system for press member position control,
FIGURE 10 schematically illustrates a forging press,
FIGURE 11 schematically shows a hydraulic control system for a forging press,
FIGURES 12 and 13 are a circuit diagram illustrating a modified form of the press member position control system of FIGURES 7, 8 and 9,
FIGURE 14 illustrates the timing mechanism employed in the system of FIGURES 12 and 13, and
FIGURE 15 is a circuit diagram of a co-ordinating control arrangement for use in association with the manipulator and press positional controls of the above figures.

Before proceeding with a detailed description of the drawings the general organisation of the overall system and its operation will be briefly described.

*General organisation*

The overall system can conveniently be considered as consisting of three parts namely a manipulator positional control system, a forging press control system, and a co-ordinating system, the latter system providing a control link by means of which the operations of the other two systems can be co-ordinated to produce the maximum efficiency of operation with a minimum of manual supervision and time wastage.

It will be appreciated that from the moment it leaves the pre-heating furnace the work piece is losing heat and that if the forging process takes too long it may have to be interrupted whilst the work piece is returned to the furnace for reheating thus giving rise to time wastage and the expense of raising the temperature of the work piece each time it cools below useful forging temperature. It is thus of considerable importance that once the work piece leaves the furnace there should be the minimum of delay in forging it to the required shape. Substantial progress towards this end is achieved by automatic control of the forging press itself and further progress can be achieved by automatic control of the manipulator which positions the work piece in the press between forging strokes. The system of the present invention provides even further progress by controlling the manipulator from the press and/or vice versa in such a manner that each can operate in its own fashion immediately such operation is permissible having regard to the operation of the other. In the preferred form of the system to be described the various positional control operations of the manipulator are initiated by the press in such a manner that movement of the work piece may start immediately the press is sufficiently open to permit the necessary movement. Since longitudinal movement involves greater inertia than rotary movement initiation of the former is effected prior to initiation of the latter so that the press is still opening whilst the manipulator is preparing to move the work piece. Upon completion of positional control the manipulator can be arranged to initiate the next stroke of the press and it will be appreciated that either or both forms of initiation control can advantageously improve the performance of the press-manipulator combination.

*Manipulator control system*

Referring now to FIGURES 1–6 of the drawings and in particular to FIGURES 1 and 2, the manipulator comprises a carriage 12 mounted on wheels 13 and driven by a stationary motor 14. The motor 14 drives through a gear box 14a having a pinion 15 on its output shaft engaging with the teeth of a rack 16 which is attached to the carriage 12. The manipulator has a peel 17 carrying at one end a pair of jaws 18 for holding an ingot to be forged.

As well as being capable of movement longitudinally on the wheels 13, the peel 17 can move vertically with respect to the carriage 12 and rotationally about its own axis. Rotational movement is achieved by bearings 20 which support the peel rotationally. Vertical movement is achieved by a pair of links 21a which are pivoted to the bearings 20 and to stanchions 21 secured to the chassis 12.

The circuit for controlling the manipulator longitudinally is shown in FIGURES 3 and 4. Referring first to FIGURE 4, a voltage is developed in accordance with the position of the manipulator, by means of a ten-turn potentiometer 22 mounted on the output shaft of gear box 14a (see FIGURE 2). The voltage from potentiometer 22 is opposed to the voltage from an input potentiometer shown generally at 23. Potentiometer 23 is selectively operated in the manner to be described in accordance with the digital value of the desired position of the manipulator. The output shaft of gear box 14a also drives a tacho-generator 24 through a chain drive 25 (FIGURES 1 and 2) and the output of the tacho-generator is applied to the input terminals 26 (FIGURE 4).

Both the potentiometers 22, 23 and the tacho-generator 24 are supplied with the same alternating voltage. The error signal, which is proportional to the difference in voltage obtained from the potentiometers 22, 23 is applied on line 28 and is combined with the tacho-generator output voltage from terminals 26, after passing through the bridge circuit 27. The combined signal is applied to a two-stage amplifier 29, 30 and amplified signal is biased by an A.C. reference voltage on line 31, derived from the same A.C. source as that supplying the potentiometers 22, 23. The biased signal is applied to a cathode follower 32 and then to a rectifying diode 33. The rectified voltage is smoothed and is applied to the control grids of two pentodes 34, 35.

The bias voltage on line 31 is also applied to a cathode follower 36, is rectified by a diode 37 and smoothed, the smoothed output appearing across two potentiometers 38, 40 in series. The sliders of potentiometers 38, 40 are connected to the control grids of two further pentodes 41, 42 respectively. Each of the pentodes 34, 41 is connected in series with one winding of a relay 43 controlling movement of the manipulator in the forward direction. The windings of relay 43 are differentially wound. Similarly, each of pentodes 35, 42 is connected in series with one winding of a relay 44 which controls movement of the manipulator in the reverse direction.

When the manipulator is at approximately the correct position, as set by the input potentiometer 23, the voltage applied to the control grids of pentodes 34, 35 lies between the voltages on the sliders of the potentiometers 38, 40. Under these conditions, the current passed by pentode 41 exceeds that passed by the pentode 34 and the relay 43 remains in its off position. At the same time, the current through pentode 35 exceeds that through pentode 42 and, similarly, relay 44 is in its off position. If the manipulator is in a position rearward of the position set by the potentiometer 23, the voltage applied to pentodes 34, 35 exceeds the voltage from potentiometer 38; as a result, more current is passed by pentode 34 than pentode 41 and relay 43 is changed to its on position to cause operation of the motor 14 (FIGURE 1) in the forward direction. However, the current through pentode 35 still exceeds that through pentode 42 and relay 44 remains off. If the manipulator is in a position forwardly of the position set by potentiometer 23, then the voltage applied to pentode 34, 35 is less than that supplied by potentiometer 40 and, as a result, more current is passed by pentode 42 than is passed by pentode 35 and relay 44 is changed to its on position to cause the motor 14 to drive the manipulator in the reverse direction. However, relay 43 remains de-energised.

The motor 14 is a hydraulic motor and the relays 43, 44 control valves, in turn controlling the forward and reverse operations of the motor.

Figure 3A:
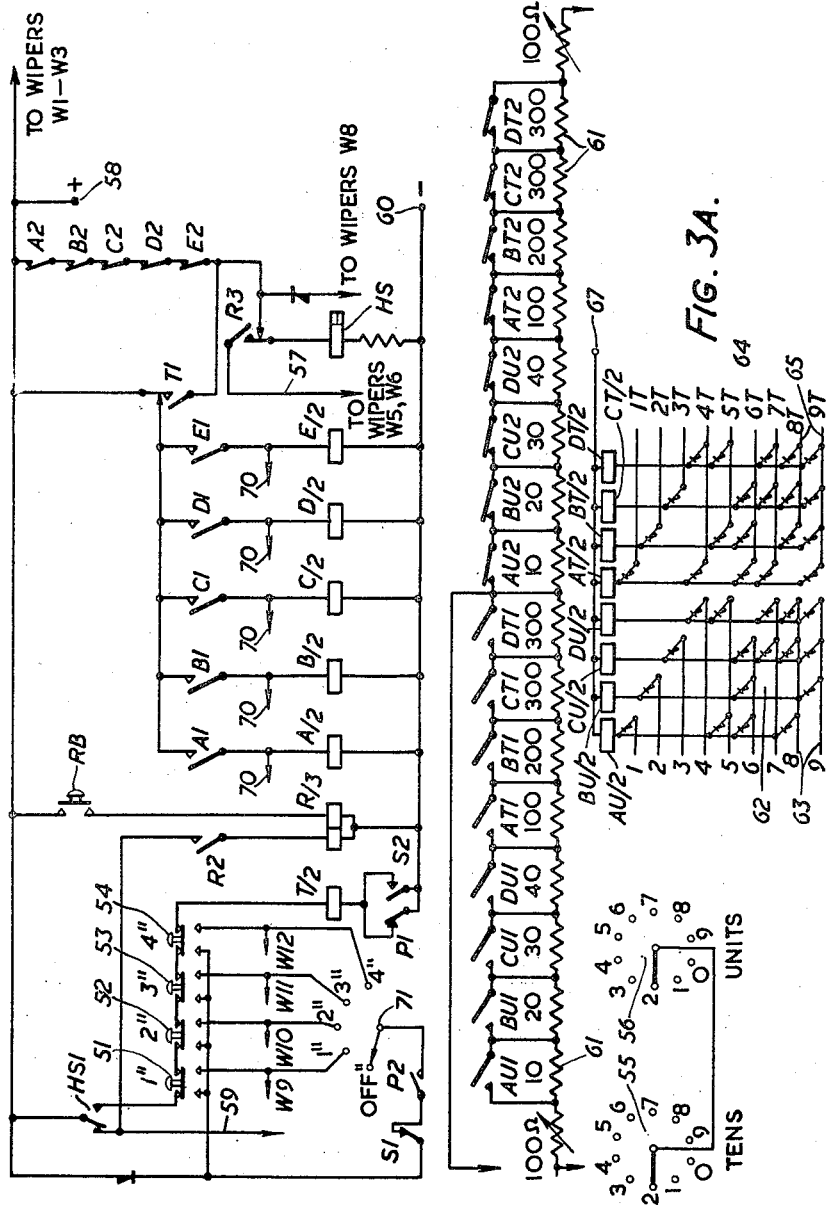
Figure 3B:
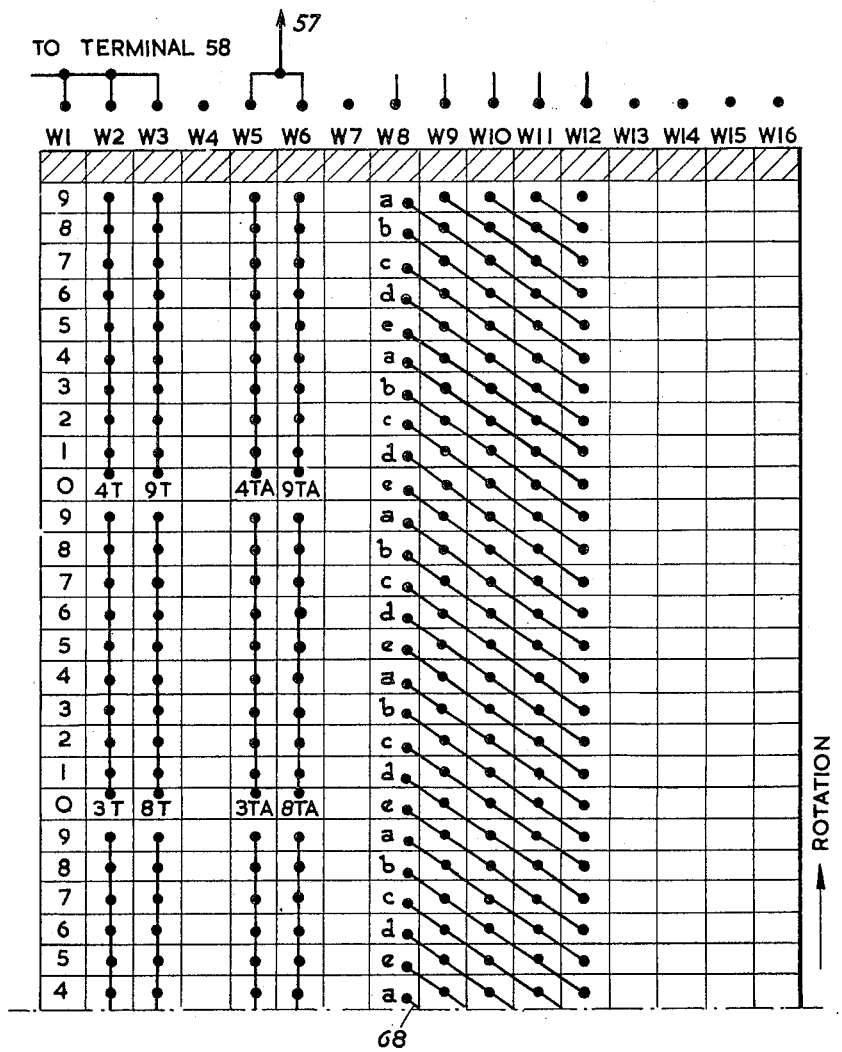
Figure 4:
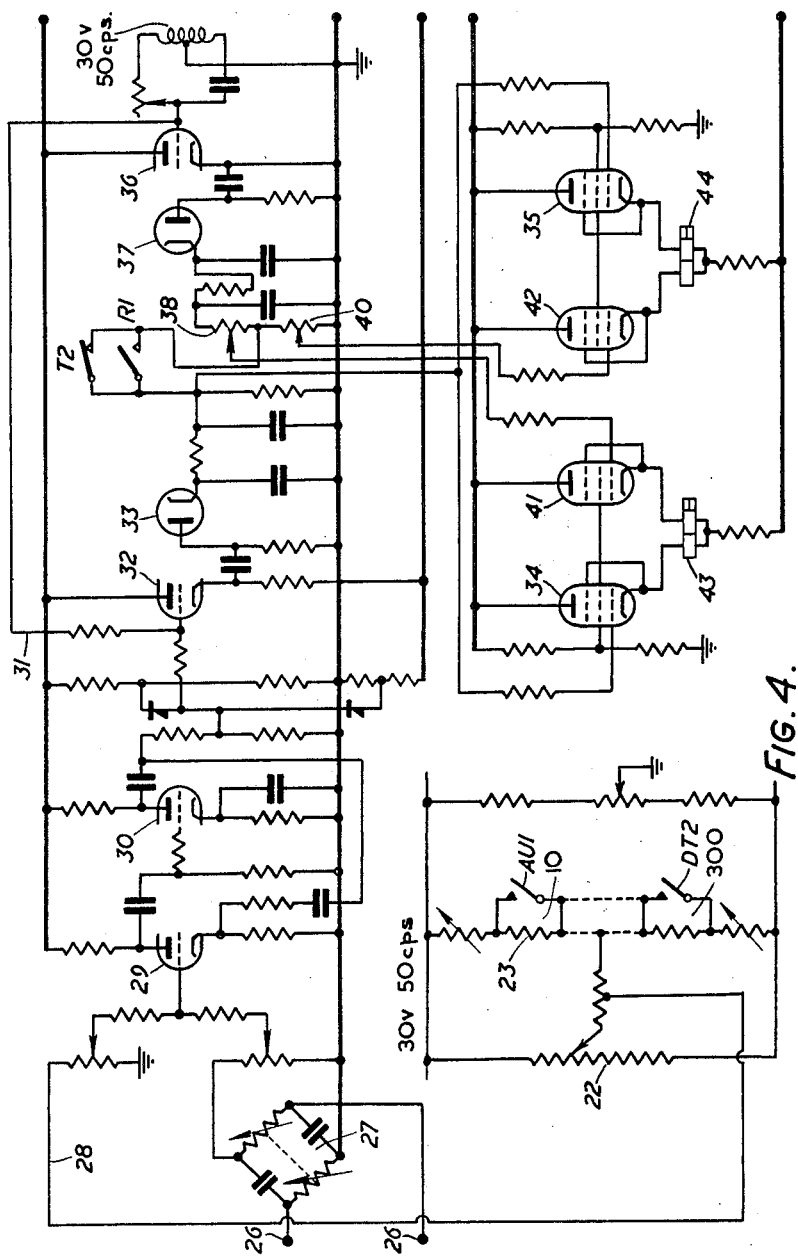

FIGURES 3A, 3B and 3C illustrate the circuit for setting the input potentiometer 23 (FIGURE 4). For convenience, this potentiometer is also shown in FIGURE 3A. The circuit includes a Post Office motor uniselector which is shown in two parts in FIGURES 3B and 3C, these figures being designed to be read with FIGURE 3B above FIGURE 3C. The stator of the uniselector is shown in expanded form, the different levels being shown as different columns, and the wipers being illustrated beneath the stator in FIGURE 3C. The connections to the wipers are shown, for the sake of simplicity, at the top of the stator in FIGURE 3B and are numbered W1 to W16. Furthermore, the way in which the stator contacts are connected together is illustrated in the drawing; thus, in the levels corresponding to wipers W8 to W12 the contacts are connected diagonally, the first contact in level 12 being connected to the second contact in level 11, to the third contact in level 10 and so on.

The circuit of FIGURE 3 is designed to cause the manipulator to move rearwardly through fixed distances of 1, 2, 3 or 4 inches on appropriate operation of the push buttons 51, 52, 53, 54 respectively. Furthermore, the manipulator can be reset after each rearward movement by appropriately setting a "tens" rotary switch 55 and a units rotary switch 56 and by pressing a reset button RB.

Considering first the control of the manipulator to a position set by the setting of switches 55, 56, the wipers of the motor uniselector are normally kept stationary by the energisation of the high speed relay HS of the uniselector through closed contacts T1. On operation of the reset button RB, relay R is energised and the contacts R3 change over to disconnect relay HS from contacts T1 and to connect relay HS to line 57 leading to wipers W5, W6. Relay HS is de-energised and changes over its contacts HS1, thereby de-energising relay T and establishing a holding circuit for relay R through the closed contacts R2. When the relay HS is de-energised, the latch coil (not shown) of the uniselector is energised through contacts HS1 and line 59 and the motor uniselector continues to move until relay HS is again energised. This will occur when the wipers of the uniselector have stepped to a position corresponding to the setting of switches 55, 56, the stationary contacts of which are selectively connected to the contacts in levels W5, W6 and W1 respectively in the manner indicated in FIGURES 3B, 3C. Thus, the "0" contact of switch 55 is connected to the first ten contacts 0TA in level W5, contact "1" is connected to the next ten contacts 1TA in the same level and so on. The contact positions in level 1 have been numbered according to the number of the stationary contacts of switch 56 to which they are connected.

When the wipers of the uniselector have stepped to a position where the contact in level 5 or level 6 is connected to the selected contact of switch 55 and the contact in level 1 is connected to the selected contact of switch 56, a circuit is completed from the + positive supply terminal 58 (FIGURE 3A), through the wiper W1 (FIGURE 3B), the stationary contact in that level, the switch 56, switch 55, the connected contact in level 5 or level 6, wiper W5 or W6, line 57, closed contacts R3, and high speed relay HS, to the −50 volt terminal 60. The high speed relay HS is therefore energised, contacts HS1 change over and prevent further stepping of the uniselector, relay T is re-energised, relay R is de-energised and the hold circuit for relay HS re-established through contacts R3.

The position at which the wipers of the motor uniselector are stopped determines the setting of the potentiometer 23. As shown in FIGURE 3A, this potentiometer consists of two chains of resistors 61 connected in series across the A.C. supply, each chain consisting of eight resistors having the values 10, 20, 30, 40, 100, 200, 300 and 300 ohms successively. The resistors of the first chain can be individually short circuited by the contacts AU1–DU1 and AT1–DT1 of relays AU, BU, CU, DU, AT, BT, CT and DT. Similarly, the resistors of the second chain can be individually short circuited by contacts AU2–DU2 and AT2–DT2 of the same relays. The contacts of the first chain are normally open while those of the second chain are normally closed; as a result, the total resistance of the two chains is unaltered by the operation of any of the relays. The relays AU–DU are selectively energised through a diode matrix 62 by the lines 63 which are numbered according to the units value it is desired to select and which are connected to the correspondingly numbered contacts in level 1 of the uniselector. Similarly, relays AT–DT are selectively energised through a second matrix 64 by nine lines 65 which are numbered 1T–9T corresponding to the "tens" value to be selected and which are connected to the correspondingly numbered contacts in the second and third levels of the uniselector. When the wipers stop at a prescribed position on the uniselector, the relays AU–DT are selectively energised to select a voltage on the connecting point of the two chains of resistors, dependent on the position of the wipers. If, for example, 22 inches has been selected by operation of the switches 55, 56 and the reset button RB has been operated, the wipers will stop at the position indicated at 66 on the uniselector chart and with the wiper W2 in contact with the contact in level 2 at position 66; wiper W3, like wiper W2, is single ended and will not be in engagement with any of the indicated contacts. A circuit will then be completed from the positive terminal 58 through wiper W1, contact "2" in level 1 at position 66, the line 63 numbered "2," and relay BU to the negative supply terminal 67. Another circuit is completed from positive terminal 58, through wiper W2, the contact in level 2 of the uniselector, line 2T, and relay BT to the negative terminal 67. As a consequence, contacts BU1 and BT1 will be closed and contacts BU2 and BT2 opened to change the potential of the centre point of the resistor chains by an amount proportional to 22.

Relay T has normally closed contacts T2 and relay R has normally open contacts R1 connected in parallel between the common connecting point of resistors 38, 40 (FIGURE 4) and the control grids of pentodes 34, 35. When either contacts T2, R1 are closed, grid voltages to the pentodes 34, 35 is locked and prevent operation of motor 14 (FIGURE 1). Operation of press-button RB energises relay R so that motor 14 is rendered inoperative until potentiometer 23 has been brought to its new setting and relay R de-energised. In this way, the manipulator is prevented from attempting to follow the changes in the resistance of potentiometer during setting of the latter.

Turning now to the operation of the manipulator under control of the push buttons 51–54, the actuation of any of these buttons opens the circuit to relay T. Relay T is de-energised and closing of its contacts T2 locks the grid voltages of pentodes 34, 35 as before. Relay HS remains energised through contacts A2–E2, but contacts T1 open as shown to connect contacts A1–E1 to positive terminal 58. Actuation of the push button also connects the positive terminal 58 to one of the wipers W9–W12. Suppose, for example, that the press button 52, corresponding to a movement of two inches, is operated and that, before operation, the wipers of the uniselector are at position 66. The diagonal connection 68 will then be energised through the closed contacts of button 52, wiper W10 and the contact in level 10 and position 66 of the uniselector. The diagonal connections are referenced successively and repetitively *a*, *b*, *c*, *d* and *e*, as indicated, and all those connections referenced *a* are connected through the line 70 to relay A. Similarly all connections referenced *b*, *c*, *d* and *e* are connected through similar lines 70 to relays *b*, *c*, *d* and *e* respectively. Thus in the example taken, positive potential will be applied through the diagonal connection 68 to relay A, the energisation of which causes contact A1 to close and to establish a holding circuit to relay A and, through line 70, to the diagonal connection 68. At the same time contacts A2 open and de-energise relay HS. As before, the uniselector wipers step over the contacts until the high speed relay HS is re-energised; this occurs when wiper W8 engages a contact of the uniselector which is held positive through contacts A1 and the connected line 70. Thus, the wipers will move two positions so that wiper W8 engages with the contact in level 8 connected by the diagonal connection 68. On re-energisation of relay HS, contacts HS1 change over and cause relay T to be energised and a holding circuit for relay HS to be established through contacts T1. Simultaneously, relay A is de-energised by the closing of contacts T1. As will be readily understood from the foregoing description, the movement of the wipers through two steps changes the connections to the matrices 62, 64 and thereby the selective operation of contacts AU1–DT1 and AU2–DT2, so that the manipulator moves backwardly through two inches.

Exactly the same operation is performed when one of the other push buttons 51, 53, 54 is actuated. However, the number of steps effected by the wipers of the uniselector differs in each case, according to which wiper W9, W11, W12 is energised.

The incremental setting of the manipulator by the selective energisation of wipers W9–W12 may alternatively be controlled through a rotary switch 71. When this switch is moved from "OFF," to the two inches setting, for example, and the contacts S1, S2, P1, P2 operated, one of the lines W9–W12 is pulsed and the apparatus operates as described to withdraw the manipulator through two inches. The contacts S1, S2, P1, P2 are contacts of relays operated by the forging press so that the movement of the manipulator is interlocked with the press as will be described in detail hereinafter.

For the control of vertical motion of the peel 17, a hydraulic cylinder 72 (FIGURE 1) which raises or lowers the ingot incorporates a continuous servo system, in that movement of its ram is proportional to movement of its pilot valve, a direct connection between ram and pilot valve providing feedback.

The pilot valve is coupled to an electric motor 73 by a nut and screw-type gearing 74 and control of this motor is by an on-off electrical system similar to those previously described. In this case, potential dividers are used for position setting and position detecting, and electronically operated relays (not shown) control the direction of motion of the electric motor. This in turn moves the pilot valve, and the ram, following up, raises or lowers the ingot.

The position detecting potential divider 75 is rotated by rack and pinion drive from the ram, and the input potential divider is scaled 0–8 inches (the lifting range). Rotation of the input potential divider is followed by a corresponding movement of the manipulator. A tacho-generator (not shown) is geared to the electric motor to provide a velocity feedback signal. Accuracy is about $\pm \frac{1}{16}''$, and the 8″ range can be traversed in 2 seconds.

The input setting unit for vertical motion is a simple manually set rotary potential divider, similar to those used in the press control circuit to be described hereinafter. The error signal operating the control is the difference voltage between the slider of this input potential divider and the slider of a similar potential divider geared to the vertical motion hydraulic cylinder.

The peel 17 is rotated by a hydraulic motor 76 (FIGURE 1) through a pinion 77 and a meshing gear wheel 78 secured to the peel. Gear wheel 78 also meshes with a pinion 80 on the shaft of a synchro 81 which also drives a tacho-generator 79.

The motor 76 is controlled by solenoid-operated valves, which are in turn controlled by relays which will be referred to as 43′, 44′ similar to relays 43, 44 of FIGURE 4. Control of these relays is effected by a setting synchro 82 (FIGURE 5), the output of which depends on the angular difference between it and synchro 81 and is applied to terminal 28′ of a circuit (not shown) generally similar to that of FIGURE 4, but omitting the contacts T2, R1. The tacho-generator output is applied to line 26′ as before, as in the case of longitudinal control, when the error signal, representing a different setting of the synchro 81 with respect to the synchro 82, falls outside the dead band set by the potentiometers 38′, 40′, relay 43′ or 44′ is operated to cause the hydraulic motor 76 (FIGURE 1) to drive the peel until the error between the two synchros is reduced substantially to zero.

Both the output synchro 81 and the setting synchro 82 have single phase rotor windings 81a, 82a, and three phase delta stator windings 81b, 82b, as shown diagrammatically in FIGURE 6. There is additionally a differential synchro 90 having three phase stator and rotor windings 90a, 90b. The rotor of synchro 90 can be turned relative to the stator by the adjustable dial 91. Rotor winding 81a is connected to the reference source of alternating current, windings 81b, 90a are connected together as shown, as the windings 90b, 82b, while stator winding 82a is connected to line 28 of the amplifier (FIGURE 4). The initial setting of the peel is adjusted by operation of the dial 91; thereafter the peel may be rotated in a single direction only through prescribed angles by the circuit of FIGURE 5.

The circuit of FIGURE 5 is designed to cause the setting synchro 82, and hence the peel 17, to turn through any of a number of predetermined angles, which in the example given are 90°, 45°, 22½° and 15°. The shaft of the setting synchro 82 carries a ratchet wheel 83 which is driven by an electromagnetic ratchet device indicated at 84. This ratchet device 84 rotates the ratchet 83 through one tooth, each time the operating solenoid Y is pulsed. This movement of the ratchet wheel 83 is equivalent to a movement of 3¾° movement of the peel 17.

The solenoid Y is supplied with the requisite number of pulses for the required angle of movement of the peel 17 by a uniselector, the various levels of which are shown at Z1–Z7, the coil of which is shown at Z and the interruptor contacts of which are shown at IC.

The angle of movement of the peel 16 is selected by the positioning of a 4-position, multipole switch, the poles of which are shown at SW1–SW2, SW3 and SW4. When the switch SW is placed in its first position, as shown, to select an angle of 15°, and the button PB is pressed, the relay P is energised and the contacts P1 open. However, before contact P1 opens, a circuit is completed from the positive supply terminal 85, through button PB, contacts P1, switch SW1 and SW2, the uniselector coil Z and the interruptor contacts IC to the negative supply terminal 86. As a result, the uniselector rotates by one step. In levels Z1, Z2 which are connected in parallel, all the contacts are connected together, with the exception of every fourth contact. Therefore, the initial rotation of the uniselector through one step, causes the wipers in levels Z1, Z2 to be energised from the positive supply terminal 85 and to complete the circuit to coil Z and contacts IC. As a result, the solenoid Y, which is connected through switch SW3 and level Z3 in series with the wipers Z1, Z2 and the interruptor contacts IC, is supplied with four pulses and the synchro is rotated through an angle equal to four teeth of the ratchet wheel 83, i.e. 15°. After the uniselector has rotated through four steps, the wipers in level Z1, Z2 reach a contact which is not connected to terminal 85 and further stepping of the synchro stops.

When the switch SW is placed on any of the other three positions, corresponding to angles of 22½°, 45° and 90°, the coil Z and the contacts IC are pulsed through a circuit from terminal 85, button PB, contacts P1, switch SW1, a line 87, the first contact of level Z7, switch SW2, to the coil Z and contacts IC. The uniselector rotates through one step and, as the remaining contacts of level Z7 are connected to terminal 85, the uniselector continues to step through all its contacts until it returns to the first contact. The solenoid Y is connected through switch SW3 to the wipers of levels Z4, Z5, Z6. In level Z4 the second to seventh contacts are connected to switch SW4, so that when switch SW is placed in the 22½° position, six pulses are applied by level Z4 to the solenoid Y and the synchro 82 is rotated through 22½°. Similarly, when switch SW is in either the 45° or 90° position, 12 or 24 pulses, respectively, are applied to the solenoid Y and the synchro is rotated through 45° and 90° respectively.

The automatic control of rotational movement will be described hereinafter in connection with FIGURE 15.

*Forging press control system*

Referring now to FIGURES 7–14 of the drawings and particularly to FIGURE 7, the press member to be controlled is coupled to the slider 12 on a potentiometer 13 which is connected across the supply lines 14, 15. The voltage of the slider 12 is then proportional to the position of that press member. The upper and lower limits of movement of the press member are set by the potentiometers 16, 17 respectively, the sliders 18, 19 of which are adjusted to the respective desired values; as shown potentiometers 16, 17 are also connected across supply lines 14, 15.

Sliders 18, 19 are connected to opposite poles of a switch $A_2$ formed by the contacts of a relay A. The moving contact of contacts $A_2$ is connected to a polarized relay PR through a voltage divider 20 and contacts $L_1$. By these means the voltage of slider 18, or of slider 19, is applied to relay PR and this voltage is opposed by the voltage of potentiometer 13, the slider 12 of which is connected through a voltage divider 21 to the relay PR.

A tacho-generator TA is also coupled to the press member to be controlled and produces a voltage proportional to the speed of movement of the member. This voltage is applied, either through contacts $A_1$ of relay A or, when contacts $A_1$ are open, through potentiometer 22, to voltage divider 21 so as to back off the position-representing voltage from potentiometer 13.

The sensitive relay PR is protected from overloads by a relay L which is connected in series with relay PR. Relay L has the beforementioned contacts $L_1$ which normally short circuit a resistor 23 and contacts $L_2$ which connect a resistor 24 across either relay L or relay PR. When the current flow becomes excessive relay L is energised and contacts $L_1$, $L_2$ are moved from the positions shown in order to introduce series resistance and in order to shunt relay PR.

Polarised relay PR has contacts forming a centre stable two-pole switch PR1 which, in one position, causes energisation of an "Up" relay U controlling movement upwards of the element and, in the other position, causes energisation of a "Down" relay D which controls downward movement. Relay U has contacts $U_1$ connected in series with a relay $U_x$ across supply lines 14, 15; a variable condenser $C_D$ is connected in parallel with relay $U_x$ to supply an adjustable delay between the opening of contacts $U_1$ and the de-energising of relay $U_x$.

Relays D, $U_x$ have contacts $D_1$, $U_{x2}$ connected in parallel between supply line 15 and a terminal 25 (FIGURE 8). Contacts $U_{x2}$ are connected in series with a three position switch 26 while a button PS1 is connected in parallel with contacts $D_1$. Supply line 14 is connected through a three position switch 27 ganged with switch 26 to each of the windings of each of three relays A, $A^1$, B. Each of these relays has two windings and is operated only when current flows through one only of the windings. Relays A, $A^1$ are connected in parallel and operate together, one winding of each being connected to one pole of a switch $A_1^1$ of relay $A^1$. One winding of relay B is connected to the other stationary contact of contacts $A_1^1$, while the moving contact is connected to terminal 25. The remaining windings of relay A, $A^1$, B are commoned and connected to a contact assembly $B_1$ of relay B. This assembly has a moving contact 28 connected direct to supply line 15 and a spring contact 30 normally engaging a fixed contact 31. When relay B is energised contact 28 engages contact 30 and in so doing disengages contact 30 from contact 31.

The movement of the press member is regulated by two servo-motors, the windings of which are shown at CS and OS of FIGURE 9, winding CS controlling downward motion and OS upward motion. Winding CS is connected in series with contacts $C_2$ of relay C, normally closed contacts $U_4$ of relay U, and normally open contacts $D_2$ of relay D across one of the phases of a 3-phase supply $L_1$, $L_2$, $L_3$. Similarly, winding OS is connected in series with contacts $C_1$ of relay C, normally closed contacts $D_4$ of relay D and normally open contacts $U_2$ of relay U across another phase of the supply. Winding CS and OS are alternatively energisable by hand through contacts $C_3$ and down button 32, and through contacts $C_4$ and up button 33, respectively.

For the automatic control of the element, ganged switches $AM_1$, $AM_2$, $AM_3$ are placed in the left hand positions shown. This has the effect of energising relay C and consequently of closing contacts $C_1$, $C_2$ and opening contacts $C_3$, $C_4$. When the switches are in their manual positions, relay C is de-energised and contacts $C_3$, $C_4$ close to enable the servo-motors to be controlled by buttons 32, 33.

During automatic control, the apparatus performs a cycle of operations in which the position-representing voltage from potentiometer 13 is compared with the bottom-limit signal from potentiometer 17, relay D is energised to cause downward motion of the element until the signal applied to relay PR becomes zero, relay A changes over so that the voltage from potentiometer 13 is compared with that from potentiometer 18, relays U and $U_x$ are energised to cause upward motion of the element until the signal applied to relay PR becomes zero again, and, after a delay determined by condenser $C_D$, relay A operates to start the next cycle.

Considering the operation of the apparatus in detail, at rest the press member is in the position determined by the top limit potentiometer 17, relay PR is de-energised and therefore relays U, $U_x$, D are de-energized. For automatic repetitive motion of the press, switches $AM_1$, $AM_2$, $AM_3$ are put in their left hand positions, switches 26, 27 are placed in their "R" settings and button PS1 is pressed to initiate operation.

Pressing of button PS1 has the effect of causing relay B to operate since its left hand winding is energised. On operation of contacts $B_1$, relay B remains energised and relays A, $A_1$ remain de-energized until button PS1 is released when the voltage on the moving contact of switch $A_1^1$ is removed and relays A, $A^1$ are operated. Switch $A_2$ is changed over to connect the bottom limit potentiometer 17 to relay PR. Relay PR is operated to cause its contact PR1 to energise relay D, which in turn energises winding CS through contacts $D_2$ and the press member is driven downward.

When relay D is energised contacts $D_1$ (FIGURE 8) close and the voltage of line 15 is applied to contacts $A_1^1$. When this occurs, both windings of relay B are energised and relay B becomes non-operated. When however contacts $B_1$ reopen, the energisation of relays A, $A^1$, B is unaltered.

As the element is driven downwards, the resultant signal applied to relay PR decreases progressively and becomes zero shortly before the press member reaches the desired low limit, owing to the velocity-representing signal from tacho-generator T. When this occurs, relays PR and D and winding CS are de-energized and the press member comes to rest through its momentum at the lower limit.

When relay D is de-energised at the bottom of the travel of the press member, contacts $D_1$ open; relays A, $A^1$, the right hand windings of which were formerly energised through contacts 30, 31 and contacts $D_1$, become non-operated, and contacts $A_1^1$ are restored to the position shown in FIGURE 2, relay B remaining de-energised. De-energising of relay A changes over contacts $A_2$ which then connects upper limit potentiometer 16 to relay PR. Relay PR is operated to cause relay U to be energised. This in turn results in winding OS being energised by the closing of contacts $U_2$ and in relay $U_x$ being energised by the closing of contacts $U_1$. The press member is driven upwards again.

Energizing relay $U_x$ causes contacts $U_{x2}$ to close and to apply the voltage of line 15 to both the windings of relays A, $A^1$ which remain non-operated. At the same time relay B is operated by the energization of its left hand winding. Contacts $B_1$ change over but, in so doing, the relays A, $A^1$, B are unaltered and, in particular, contacts $A_2$ remain as shown in FIGURE 7.

As determined by the signal supplied by the tacho-generator T, the signal applied to relay PR becomes zero shortly before the press member reaches the top limit, and relays PR, U and winding OS are de-energized, the press member reaching its upper limit under its momentum. Contacts $U_1$ open but relay $U_x$ is held energised by the discharge of condenser $C_D$ for a period dependent on the setting of the condenser. When relay $U_x$ finally is de-energised, contacts $U_{x2}$ (FIGURE 8) open; the energisation of the left hand windings of relays A ($A^1$ is broken but the right hand windings remain energised through contacts 28, 30 so that relays A, $A^1$ become operated and contacts $A_2$ (FIGURE 7) change over to start a new cycle. The press member will therefore continue to reciprocate between the upper and lower limits, a delay being provided between the completion of the upward movement and the initiation of the successive downward movement. If no such delay is required, the relay $U_x$ may be removed, contacts $U_{x2}$ being replaced by contacts of relay U.

If it is desired that the press member shall be caused to make a single reciprocation only for each operation of button PS1, switches 26, 27 are moved to the "S" setting. In this case the downward movement of the press member is the same as described above. When relay D is de-energised near the bottom of the travel, relays A, $A^1$, B become de-energised, contacts $A_2$ change to the position shown in FIGURE 7 and the element is driven upwards. Upward movement causes as before at the upper limit by de-energisation of relay U. Relays A, $A^1$, B remain de-energised and the element remains at the upper limit until button PS1 is pressed again.

Manual control by the buttons 32, 33 when switches $AM_1$, $AM_2$ and $AM_3$ are in their right hand portions and relay C is de-energised is believed to be immediately obvious from FIGURE 9. This figure also shows a control panel 35 which can be used for manual control in place of buttons 32, 33. Switch $AM_2$ is connected to line $L_1$ and through the normally closed contacts 36 of a stop button to the contacts 37, 38 of an up button and a down button respectively. These contacts 37, 38 are connected in parallel to contacts 36 and are also connected separately to the winding of intermediate relays $CS^1$, $OS^1$ and then to line $L_3$. Contacts 40, 41 are connected across contacts 37, 38 and are closed on appropriate operation of the intermediate relays. Relays $CS^1$, $OS^1$ have contacts $CS_1^1$, $OS_1^1$, in series with the windings CS, OS the servo-motors, so that buttons 37, 38 control the servo-motors.

Indication of operation of the apparatus is given by the indicator lamps shown in FIGURE 8. Lamps 42, 43 indicate automatic and manual operation respectively and are connected to opposite poles of switch $AM_3$. Lamps 44, 45 indicate that the press member is approaching or is at the bottom limit and top limit respectively and is connected to the fixed contacts of contacts $A_2^1$ of relay $A_2$. All the lamps are energised from low voltage, A.C. supply lines 46.

The potentiometers 16 and 17 determine the upper and lower limits of the press member. The windings CS, OS are the windings of valves controlling the flow of liquid under pressure to the press to cause the press member to fall and rise respectively and the slider 12 and the tacho-generator TA are coupled to the press member so that the voltage derived therefrom are dependent on the position and velocity of the press member. Such a press and a hydraulic control system therefor is illustrated in FIGURES 10 and 11. In FIGURE 10 the moving press member 50 is carried on a cross head 51 which also carries the position potentiometer 12, 13 which is of rotary type. The slider 12 is connected to a sprocket 52 over which a chain 53 passes. Chain 53 is secured at one end to the base 54 of the press and carries at the other end a weight 55, so that the angular position of the sprocket 52 is determined by the position of the cross head 51 relative to the base 54.

The tacho-generator TA is carried on the fixed head 56 of the press and is driven through chain 57 from a sprocket 58. Sprocket 58 is in turn driven by chain 59 which passes round a sprocket 60 on the base 54 and which is attached at 61 to the moving cross head 51. When the cross head 51 moves the tacho-generator TA is driven at a speed proportional to the speed of the cross head.

FIGURE 11 illustrates the hydraulic control system of the press. A piston 65 works in a cylinder 66 and is coupled to the press member 50 and cross head 51. Liquid under pressure can be supplied to the piston above or below the piston through lines 67, 68 respectively. The supply of liquid to lines 67, 68 is controlled by a control valve 69 which is also connected to a pump 70 provided with a pressure relief valve 71 and to a discharge passage 72.

Valve 69 is of known type and is itself controlled hydraulically by a solenoid valve 73 having the windings OS, CS. Valve 73 is supplied by liquid under pressure through pilot pump 57 which has the usual pressure relief valve 75 to maintain a constant pressure.

Energisation of winding OS causes liquid under pressure to pass through a pipe 76 and to operate valve 69 so that liquid from pump 70 is supplied below the piston 65 through pipe 68; at the same time pipe 67 is connected to the discharge passage 72 and the press opens. Similarly, energisation of winding CS operates valve 69 through a pipe 77 to apply liquid from pump 70 to pipe 67 and to connect pipe 68 to the discharge passage 72; thus has the effect of causing the piston 65 to descend and to close the press.

It will be observed that the arrangement of contacts $A_1$ and voltage divider 22 are such that a larger velocity feedback signal is applied to the polarised relay PR while the element is moving upwards than when it is moving downwards. This is because the final downward movement of the press member of a forging press is resisted by deformation of the metal being forged so that the press member is less likely to over-run at the bottom limit than at the top limit.

The delay provided by the condenser $C_D$ between successive reciprocations of the press member is to enable the ingot being forged to be manipulated. This manipulation may be controlled either by hand or automatically; in the latter case, the control of the manipulators may be linked to the control of the press so that manipulation occurs between the time the forging tool leaves the surface of the ingot and the time the tool starts the next penetration of the ingot.

Figure 14:
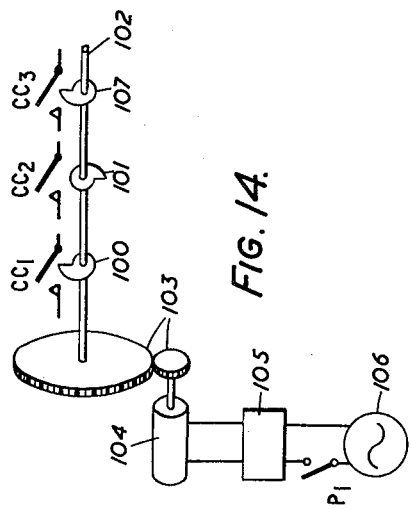
Figure 15:
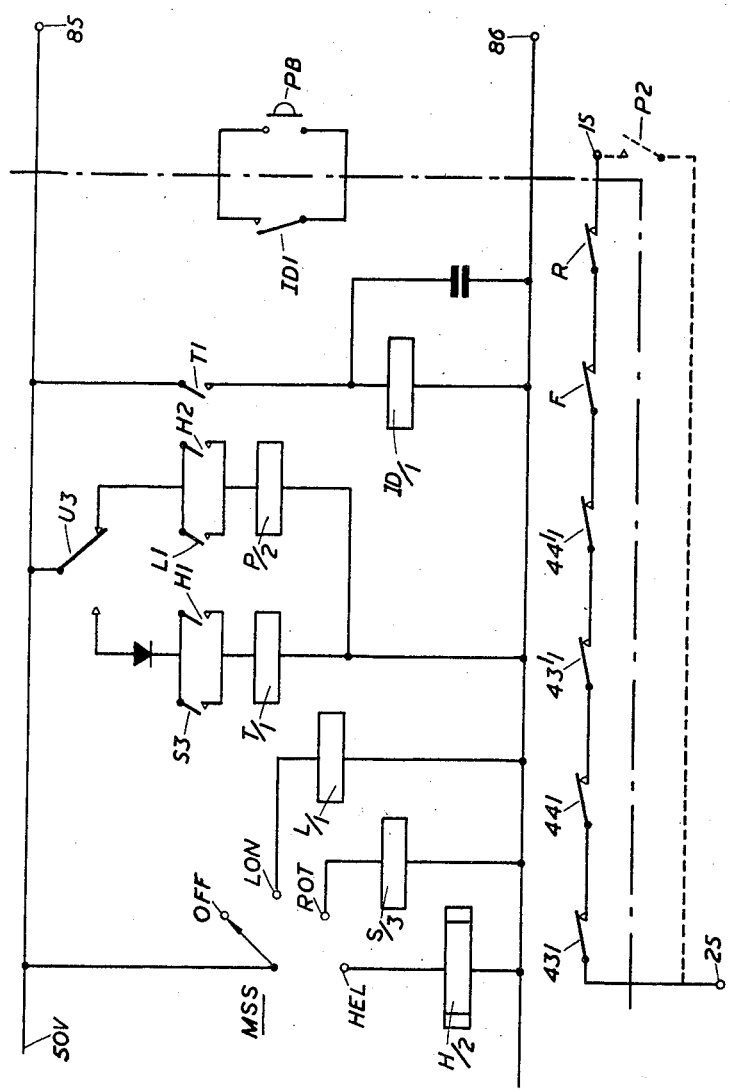

In the circuit shown in FIGURES 12 to 14, the control of the reciprocations of a press member, is effected on a fixed time cycle.

As will be seen from a comparison of FIGURES 7 and 12, the circuit for the control of the up-relay U and the down-relay D are substantially identical and the same reference numerals are used for the similar circuit elements. The change-over switch which alternately connects potentiometers 16, 17 to the detector relay PR is in this case however operated by a relay X and is therefore given the reference $X_2$. Similarly the contacts connected across potentiometer 22 pertain in relay X and are given the reference $X_3$.

Relay X is connected between normally open cam-operated contacts CC1 and normally closed cam-operated contacts CC2. Contacts CC1, CC2 are also connected to supply lines 14, 15 respectively. Hold contacts $X_1$ of relay X are connected across contacts CC1.

As shown in FIGURE 14, contacts CC1, CC2 are operated by cams 100, 101 carried on a shaft 102 which is driven through reduction gears 103 by an adjustable speed electric motor 104. Motor 104 is energised through a speed regulator 105 and contacts $P_1$ from an A.C. source 106. On each revolution of shaft 102, contacts CC1 are momentarily closed by cam 100 at the beginning of the operating cycle and contacts CC2 are momentarily opened subsequently in the cycle after a time period sufficiently long to enable the variable to be altered from the upper limit to the lower limit.

At the start of the operating cycle, the momentary closing of contacts CC1 causes energisation of relay X and the consequential closing of a holding circuit for relay X in parallel with contacts CC1. The energisation of relay X also changes over contacts $X_2$ so that the lower limit potentiometer 19 is connected to detector relay PR and relay D is energised to initiate downward movement through the circuit of FIGURE 9. The press member is brought to rest at the lower limit by the de-energisation of relay PR and remains there until contacts CC2 are momentarily opened. When this happens, relay X is de-energised and contacts $X_1$ reopen so as to keep the relay de-energised until contacts CC1 are closed in the next cycle. De-energisation of relay X causes contacts $X_2$ to change over and connect the upper limit potentiometer 18 to relay PR. Relay U is now energised to cause the press member to be driven to the upper limit where it is halted by the de-energisation of relay PR and remains until the next cycle is initiated by the closing of contacts CC1.

The control of motor 103 by contacts $P_1$ is illustrated in FIGURE 13 where relay P is shown as connected in series with push-button contacts PS2 and change-over contacts $Q_1$, between supply lines 14, 15. Normally open contacts $P_2$ of relay P are connected in parallel with contacts PS2 to provide a hold circuit. The other fixed contact of change-over contacts $Q_1$ is connected to line 15 through normally closed contacts $P_3$ of relay P and normally closed cam operated contacts CC3. Contacts CC3 are operated by a cam 107 also carried on shaft 102 so that the contacts are momentarily opened at the end of each cycle.

Change-over contacts $Q_1$ appertain to a relay Q which is connected between line 15 and a fixed contact S of a manually operated switch MS. The moving contact is connected to line 14 and the other fixed contact R is connected to normally open contacts $P_4$ of relay P, and normally open push button contacts PS3 in series. Contacts PS3 are also connected to relay Q and contacts $Q_2$ of relay Q are connected across contacts PS3.

Switch MS is placed in the S position for single cycle operation and in the R position when it is desired that the apparatus should perform repeated cycles. When the switch MS is in the S position, relay Q is energised and switch $Q_1$ is changed to the right hand position. When start button PS2 is pressed, a circuit is completed from line 14, through contacts PS2, relay P, contacts $Q_1$ and closed contacts $P_3$. Relay P is energised to complete a holding circuit through contacts $P_2$ and to energise motor 104 through contacts $P_1$. As soon as motor 104 starts moving, contacts CC3 return to their normal closed position and relay P remains energised through contacts $P_2$ and CC3. At the end of the cycle, contacts CC3 open, relay P is de-energised and motor 104 stopped. Thus, each time push button contacts PS2 are closed, the shaft 102 is driven through one revolution during which time the press member is driven from the upper limit to the lower limit and back to the upper limit.

When switch MS is in the R position, relay Q is normally de-energised and switch $Q_1$ is in the position shown. When start button PS2 is pressed, relay P is energised and is held energised by hold contacts $P_2$. The motor 104 continues to rotate continuously until the stop button PS3 is pressed and, during each revolution of shaft 102, the press member is reciprocated between the upper and lower limits. When stop button PS3 is pressed, a circuit is completed through contacts $P_4$ and PS3 to relay Q which thereby is energised and completes a holding circuit for itself through contacts $Q_2$. The change over of contacts $Q_1$ causes the circuit to revert to the condition for single reciprocations, and the relay P is de-energised and motor 104 stopped at the end of cycle in which stop button PS3 is pressed.

Indicator lights may be provided as shown at the left hand side of FIGURE 8; in this case, however, the change-over switch connected to lamps 44, 45 pertains to relay X.

The circuit illustrated in FIGURES 12 to 14 may operate through the control circuit of FIGURE 11. In this application of the system, changes in the length of travel of the press member and in the time required to operate manipulators and the like when the press member reaches its upper limit affect the operation of the system, since the overall cycle time and the time for individual operations in a cycle must be kept to a minimum compatible with the proper operation of the system. Changes in the length of travel are accommodated by adjusting cam 101 on shaft 102 until contacts CC2 are operated at the required time after contacts CC2. Changes in the overall cycle time are effected by adjusting the speed of the motor 104 by the regulator 105.

When the control system is applied to a fast acting press, it may be that the circuit as described above will be too slow for single cycle operation since the motor 104 is each time required to accelerate from rest. In this case, a simple manual control may be employed through the push button PS4. Push button PS4 when pressed completes a circuit through relay X and causes switch $X_2$ to take up its lower position. When the operator sees that the press member has been driven to its lower limit, he releases the button PS4, whereupon switch $X_2$ changes over and the press member is driven to its upper position.

Where manipulation of the ingot being forced or other ancillary operation is to be effected automatically, control may be exerted at the requisite time or times by further cams on shaft 102.

It is to be understood that the timing circuits employing the motor 104 and the cams CC1, CC2, CC3 may be replaced by an electronically operated timing circuit, using for example multivibrator and flip-flop circuits. Electronic timing circuits employing transistors or conventional tubes have the advantage that the timing can easily be altered without interrupting the operation of the press.

*Co-ordination control system*

The circuit arrangements linking the two systems just described are shown in FIGURE 15, the part of this figure to the right of the vertical chain-dotted line being the push button PB of FIGURE 5 and the parts below the horizontal chain-dotted line being the line 15 and terminal 25 of FIGURE 8 or alternatively, as indicated in dotted lines, the contact P2 of FIGURE 13.

The co-ordinating control circuit includes a manipulation selection switch MSS having an OFF position and three further positions referenced LON, ROT, and HEL by means of which longitudinal positioning, rotary positioning, or combined rotary and longitudinal positioning (helical positioning) of the manipulator respectively can be selected. In each of these positions the switch MSS energises one of three relays H, S and L.

For longitudinal positioning switch MSS is moved to position LON, relay L is energized and at its contacts L1 it prepares a circuit to energise a relay P. The operation of this relay P is however dependent upon the state of contacts U3 of the UP relay U of the forging control system and contacts U3 are only in the position shown when relay U is released upon initiation of downward movement of the press member. In the shown position of contacts U3 the closing of contacts L1 completes the energising circuit for relay P which at its P1 and P2 contacts in the manipulator control circuit (FIGURE 3A) respectively releases the relay T of that circuit and energises terminal 71 thus initiating longitudinal adjustment of the manipulator.

This initiation can be effected immediately the UP relay U is released because the inertia to be overcome in effecting longitudinal adjustment provides sufficient delay in actual movement of the manipulator for the press member to have been lowered and then raised sufficiently by the time such movement takes place. Thus the delay which would normally occur if initiation took place when the press member had risen sufficiently is avoided.

For rotary positioning of the manipulator without longitudinal movement switch MSS is moved to position ROT thus energising relay S which at its contacts S1 and S2 in the manipulator control circuit (FIGURE 3A) further interrupts the connection to terminal 71 and further closes the already closed circuit of relay T so that terminal 71 and relay T of the manipulator circuit are prevented from being affected by the contacts of relay P thus effectively isolating the longitudinal control section of the control circuit. Relay S at its contacts S3 prepares a circuit for a relay $T_1$, which circuit also includes the contacts U3 of the UP relay U. This circuit for relay $T_1$ can only be completed by contacts S3 when the up relay is energised to control upward movement of the press member. Under these conditions relay $T_1$ operates and at its contacts $T_{11}$ opens the energizing circuit of a delay relay ID which being shunted by a capacitor C is slow to release. When relay ID releases it closes its contacts ID1 shunting the push button PB of the rotary control section of the manipulator control circuit (FIGURE 5). The closing of contacts ID1 has the same effect as pressing the push button PB namely of initiating rotary positional control of the manipulator.

The delay introduced by the slow release of relay ID is arranged to be sufficient to allow the press member to rise in response to the operation of relay U to an extent sufficient to permit rotational movement of the work piece. Such delay is necessary because the inertia to be overcome in rotational movement is negligible in comparison with that involved in horizontal movement.

For helical positioning of the manipulator, that is rotary and longitudinal positioning, switch MSS is moved to position HEL thus energising relay H which at its contacts H1 and H2 prepares circuits for relays $T_1$ and P respectively. The circuit for relay P is completed when contacts U3 are in the position shown and longitudinal movement is initiated as above described. The circuit for relay $T_1$ is completed upon contacts U3 being reversed from the position shown and rotary movement is initiated after appropriate delay as above described. Thus both the longitudinal control and rotary control sections of the manipulator control circuit are rendered operative and control combined longitudinal and rotational movement of the manipulator.

During response of the manipulator control circuits to the initiation provided by the co-ordinating apparatus one or more of the relays 43, 44, 43′, 44′ (FIGURE 4) controlling the operation of the motors producing movement of the manipulator will be energised unless no manipulation is necessary between successive strokes. Additionally if vertical adjustment of the manipulator should prove necessary one or other of the relays controlling the motor for vertical positioning will be operated. Until adjustment is completed that relay, or those relays operated will remain operated and consequently contacts of such relays or contacts actuated in accordance with the operation of such relays can be utilised to indicate that adjustment is in progress and to control movement of the press member accordingly.

One manner in which this can be conveniently achieved is shown in the drawing by the chain of relay contacts 431, 441 of relays 43 and 44, of the longitudinal control circuit (FIGURE 4) 43′1 and 44′1 of relays 43′ and 44′ not shown but stated to be similar to relays 43 and 44 and embodied in a similar motor control circuit for the rotary control motor, and F and R representing contacts operated in accordance with forward and reverse movement of the vertical positioning motor. All these contacts are shown connected in series so that the circuit extending over them is only complete when all the relays are in released state. Such a chain of contacts can be used either to prevent operation of the press until all the corresponding relays are released by connecting the chain in series with a supply line in the press control circuit or to initiate operation of the press upon completion of manipulator adjustment by connecting the chain, as shown, across the manual initiating means of the press control circuit. As shown the contact chain is connected between line 15 and terminal 25 which is effectively across the push button PS1 of the manually controlled press control circuit so that completion of the chain by the closing of all the contacts effectively short circuits this push button and produces the same press stroke initiating effect as would operation of the push button.

The dotted line connections to the ends of the contact chain indicate that it can be utilised for the same purpose with the cam-controlled press control circuit. In this latter case the chain is connected across the contacts P2 which are themselves connected across the push button PS2 which is provided manually to initiate a press stroke cycle. As before completion of the chain upon completion of adjustment of the manipulator has the same effect as manual operation of the push button.

We claim:

1. An electrical control system for a forging press and workpiece manipulator comprising first positional control means for controlling longitudinal movement of a manipulator in response to an initiating signal, second positional control means for controlling rotational movement of a manipulator in response to an initiating signal, two-position switch means, means responsive to movement of a reciprocable member of a forging press in one direction of movement thereof to actuate said switch means to a first one of its two positions and responsive to movement of said member in the other direction of movement thereof to actuate said switch means to the second one of its two positions, means responsive to the actuation of said switch means to said first position to apply an initiating signal to said first control means, and means responsive to the actuation of said switch means to said second position to apply an initiating signal to said second control means.

2. An electrical control system for a forging press and workpiece manipulator comprising first positional control means for controlling longitudinal movement of a workpiece manipulator, second positional control means for controlling rotary movement of said workpiece manipulator, means responsive to the movement of a reciprocable member of a press into a predetermined position in a reciprocation cycle thereof to apply an initiating signal to said first control means without substantial delay and to apply said initiating signal to said second control means with a predetermined delay.

3. An electrical control system according to claim 2 comprising press control means for controlling operation of a forging press, and start means responsive to completion of operation of both said first and second positional control means to initiate said press control means.

4. An electrical control system according to claim 3 wherein said first and second positional control means each include at least one individual relay operable to a predetermined state during non-operation of their respective control means, and wherein said start means comprises serially connected contacts of said relays, said contacts being closed with their respective relays in said predetermined state whereby a circuit through said contacts is completed only upon completion of operation of said first and second positional control means.

5. An electrical control system according to claim 2 in which said means responsive to movement of a press member comprises a relay operable to a first state in response to downward movement of said press member, operable to a second state in response to upward movement of said press member, and having relay contacts operable to close first and second control circuits in the first and second states of said relay, respectively, said first circuit being connected to said first positional control means via time delay means to apply, when closed, an initiating signal thereto with delay, and said second circuit being connected to said second positional control means to apply, when closed, an initiating signal thereto.

6. An electrical control system for a forging press and workpiece manipulator comprising a first control system for controlling operation of a forging press, a second control system for controlling operation of a forging manipulator in longitudinal adjustment, a third control system for controlling operation of the forging manipulator in another adjustment different from longitudinal adjustment, means responsive to a first predetermined condition of said first control system to initiate operation of said second control system, and means responsive to a second predetermined condition of said first control system different from said first condition to initiate operation of said third control system.

7. An electrical control system for a forging press and workpiece manipulator comprising first positional control means for controlling longitudinal movement of a manipulator in response to a first initiating signal, second positional control means for controlling rotational movement of the manipulator in response to a second initiating signal, means responsive to movement of a reciprocable member of a forging press in one direction to produce said first initiating signal, and means responsive to movement of said reciprocable member in the other direction to produce said second initiating signal.

8. An electrical control system according to claim 7 wherein the one direction of reciprocable member movement is that during closure of the press tools of the forging press, and the other direction of reciprocable member movement is that during separation of said press tools.

9. An electrical control system for a forging press and workpiece manipulator comprising a first control system for controlling operation of a forging press, a second control system for controlling operation of a forging manipulator in a first kind of manipulator adjustment, a third control system for controlling operation of the forging manipulator in a second kind of manipulator adjustment, means responsive to different predetermined conditions of said first control system for respectively initiating said second and third control systems, and means responsive to predetermined conditions of both said second and third control system for initiating operation of said first control system.

10. An electrical control system for a forging press and workpiece manipulator comprising first positional control means for controlling longitudinal movement of a workpiece manipulator, second positional control means for controlling rotary movement of said workpiece manipulator, first initiating means responsive to movement of a reciprocable member of a forging press during closure of the tools of said press to initiate said first control means alone, second initiating means responsive to movement of said reciprocable member during separation of said tools to initiate said second control means alone, and third initiating means responsive to movement of said reciprocable member into a predetermined position in a reciprocation cycle thereof to initiate both said first and second control means, the first control means being initiated without substantial delay and the second control means being initiated with a predetermined delay by said third initiating means.

References Cited by the Examiner
UNITED STATES PATENTS

| | | | |
|---|---|---|---|
| 2,429,938 | 10/47 | Mansfield | 29—38 |
| 2,586,536 | 2/52 | Haller | 78—97 |
| 3,036,253 | 5/62 | Bramley | 318—446 |

FOREIGN PATENTS 1,248,677  11/60  France.

WILLIAM J. STEPHENSON, *Primary Examiner.*

RICHARD H. EANES, *Examiner.*